US011943583B1

(12) United States Patent
Breitbarth

(10) Patent No.: US 11,943,583 B1
(45) Date of Patent: Mar. 26, 2024

(54) SPEAKER SYSTEM, SPREADING STRUCTURE AND HEADPHONE

(71) Applicant: xMEMS Labs, Inc., Santa Clara, CA (US)

(72) Inventor: Neal Edwin Breitbarth, San Francisco, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/462,446

(22) Filed: Sep. 7, 2023

Related U.S. Application Data

(60) Provisional application No. 63/521,698, filed on Jun. 18, 2023.

(51) Int. Cl.

| | |
|---|---|
| ***H04R 1/34*** | (2006.01) |
| ***H04R 1/10*** | (2006.01) |
| ***H04R 1/24*** | (2006.01) |
| ***H04R 19/02*** | (2006.01) |

(52) U.S. Cl.

CPC ........... *H04R 1/345* (2013.01); *H04R 1/1008* (2013.01); *H04R 1/1075* (2013.01); *H04R 1/24* (2013.01); *H04R 19/02* (2013.01); *H04R 2201/003* (2013.01)

(58) Field of Classification Search

CPC ...... H04R 1/1008; H04R 1/1075; H04R 1/24; H04R 19/02; H04R 2201/003; H04R 1/34; H04R 1/345; H04R 1/02; H04R 2201/029; H04R 1/2888; H04R 1/2873; H04R 2400/11; G10K 13/00; G10K 11/28; G10K 11/30; G10K 11/32; G10K 11/357; G10K 11/35

See application file for complete search history.

(56) References Cited

U.S. PATENT DOCUMENTS

| | | | | |
|---|---|---|---|---|
| 6,343,133 | B1 * | 1/2002 | Adamson | H04R 1/26 381/337 |
| 8,718,310 | B2 * | 5/2014 | Adams | H04R 1/323 381/337 |
| 8,887,862 | B2 * | 11/2014 | Hughes, II | H04R 1/345 381/337 |
| 8,971,545 | B2 * | 3/2015 | Epping | H04R 1/1016 381/328 |
| 9,264,789 | B2 * | 2/2016 | Donarski | G10K 11/025 |
| 9,467,762 | B2 * | 10/2016 | Huang | H04R 1/1075 |
| 10,582,294 | B2 * | 3/2020 | Tu | H04R 1/345 |
| 11,503,403 | B2 * | 11/2022 | Kuwahara | H04R 1/26 |
| 2008/0013772 | A1 * | 1/2008 | Yang | H04R 1/1016 381/370 |

(Continued)

*Primary Examiner* — Angelica M McKinney

(74) *Attorney, Agent, or Firm* — Winston Hsu

(57) ABSTRACT

A speaker system includes a first acoustic transducer, a second acoustic transducer and a spreading structure. The first acoustic transducer is configured to generate a first acoustic wave. The second acoustic transducer is configured to generate a second acoustic wave. The spreading structure is disposed over the first acoustic transducer and configured to guide the first acoustic wave to propagate through a sound passage formed within the spreading structure. A directionality of the first acoustic wave is spread at a sound outlet of the spreading structure after the first acoustic wave propagates through the sound passage in the spreading structure.

30 Claims, 6 Drawing Sheets

(56) References Cited

U.S. PATENT DOCUMENTS

| | | | | |
|---|---|---|---|---|
| 2010/0109481 | A1* | 5/2010 | Buccafusca .......... | G10K 11/025<br>310/335 |
| 2014/0193022 | A1* | 7/2014 | Koizumi .............. | H04R 1/1091<br>381/380 |

* cited by examiner

SPEAKER SYSTEM, SPREADING STRUCTURE AND HEADPHONE

CROSS REFERENCE TO RELATED APPLICATIONS

This application claims the benefit of U.S. Provisional Application No. 63/521,698, filed on Jun. 18, 2023. The content of the application is incorporated herein by reference.

BACKGROUND OF THE INVENTION

1. Field of the Invention

The present invention relates to a speaker system, a spreading structure and a headphone, and more particularly, to a speaker system, a spreading structure and a headphone capable of improving an acoustic performance of an acoustic wave generated by an acoustic transducer.

2. Description of the Prior Art

Since acoustic transducers, such as acoustic chips with MEMS (Micro Electro Mechanical Systems) structures, can be widely used in various electronic devices due to their small size, the acoustic transducers are developed rapidly in recent years.

However, the acoustic wave generated by the acoustic transducer having the MEMS (Micro Electro Mechanical Systems) structure has some acoustic performances (e.g., smaller sound pressure level (SPL) and high directionality) that are not conducive to use in the acoustic devices with the greater device sound outlet. Therefore, it is necessary to improve these acoustic performances of the acoustic wave generated by the acoustic transducer.

SUMMARY OF THE INVENTION

It is therefore a primary objective of the present invention to provide a speaker system, a spreading structure and a headphone capable of improving an acoustic performance of an acoustic wave generated by an acoustic transducer.

An embodiment of the present invention provides a speaker system including a first acoustic transducer, a second acoustic transducer and a spreading structure. The first acoustic transducer is configured to generate a first acoustic wave. The second acoustic transducer is configured to generate a second acoustic wave. The spreading structure is disposed over the first acoustic transducer and configured to guide the first acoustic wave to propagate through a sound passage formed within the spreading structure. A directionality of the first acoustic wave is spread at a sound outlet of the spreading structure after the first acoustic wave propagates through the sound passage in the spreading structure.

An embodiment of the present invention provides a spreading structure disposed or to be disposed within a speaker system. The spreading structure includes a body and a cover disposed on the body. The spreading structure is disposed or to be disposed over a first acoustic transducer of the speaker system. The spreading structure is configured to guide a first acoustic wave generated by the first acoustic transducer to propagate through a sound passage formed within the spreading structure.

An embodiment of the present invention provides a headphone including a first acoustic transducer and a spreading structure. The first acoustic transducer is configured to generate a first acoustic wave, wherein the first acoustic transducer is a MEMS fabricated speaker. The spreading structure is disposed over the first acoustic transducer and configured to guide the first acoustic wave to propagate through a sound passage formed within the spreading structure. A directionality of the first acoustic wave is spread at a sound outlet of the spreading structure after the first acoustic wave propagates through the sound passage in the spreading structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
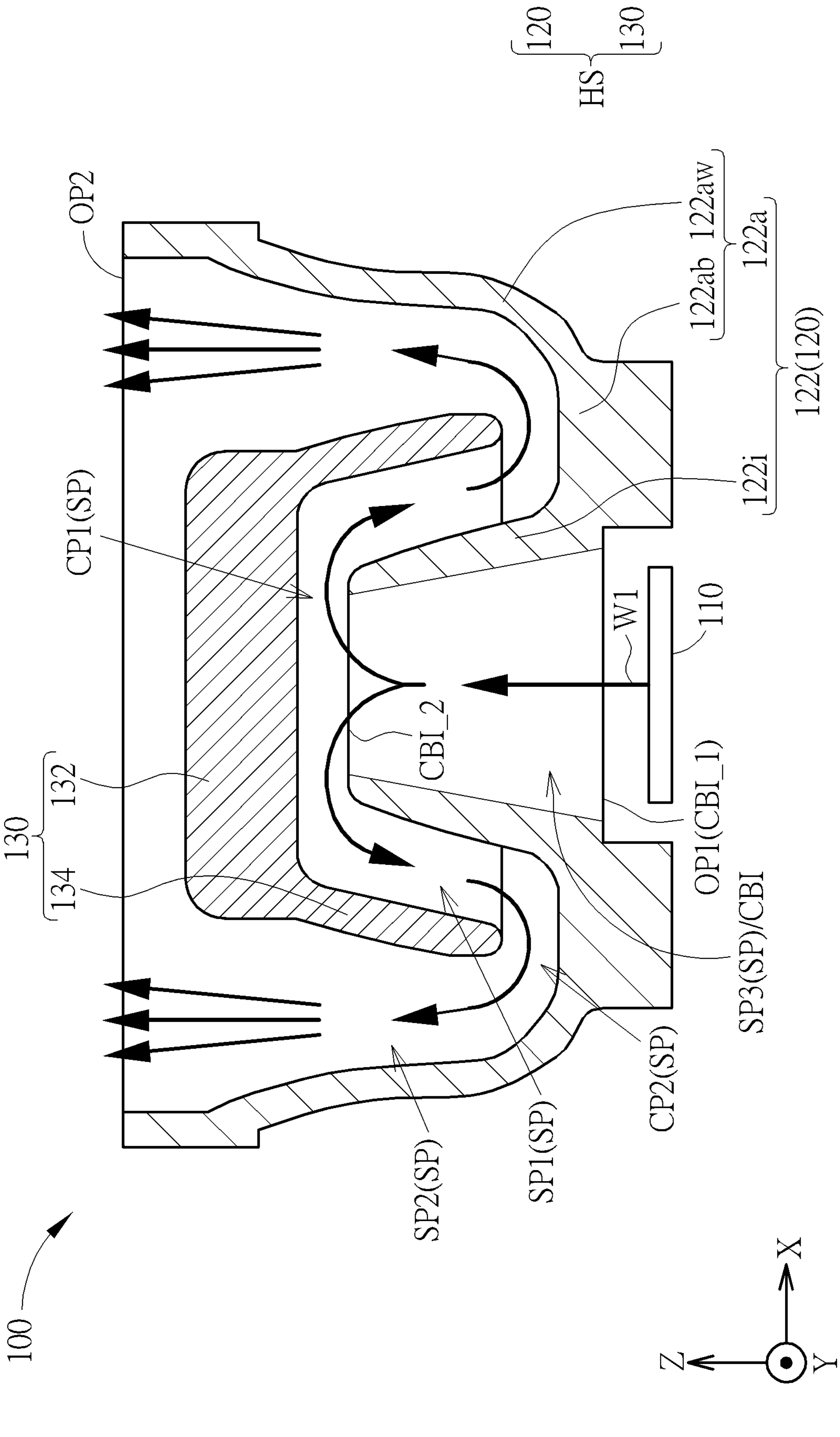
FIG. 1 is a schematic diagram of a cross-sectional view illustrating a core part of a speaker system according to an embodiment of the present invention.

To provide a better understanding of the present invention to those skilled in the art, preferred embodiments and typical material or range parameters for key components will be detailed in the follow description. These preferred embodiments of the present invention are illustrated in the accompanying drawings with numbered elements to elaborate on the contents and effects to be achieved. It should be noted that the drawings are simplified schematics, and the material and parameter ranges of key components are illustrative based on the present day technology, and therefore show only the components and combinations associated with the present invention, so as to provide a clearer description for the basic structure, implementing or operation method of the present invention. The components would be more complex in reality and the ranges of parameters or material used may evolve as technology progresses in the future. In addition, for ease of explanation, the components shown in the drawings may not represent their actual number, shape, and dimensions; details may be adjusted according to design requirements.

In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present invention, the corresponding features, areas, steps, operations and/or components would be pointed to existence, but not limited to the existence of one or a plurality of the corresponding features, areas, steps, operations and/or components.

In the following description and in the claims, when "a A1 component is formed by/of B1", B1 exist in the formation of A1 component or B1 is used in the formation of A1 component, and the existence and use of one or a plurality of other features, areas, steps, operations and/or components are not excluded in the formation of A1 component.

In the following description and in the claims, the term "substantially" generally means a small deviation may exist or not exist. For instance, the terms "substantially parallel" and "substantially along" means that an angle between two components may be less than or equal to a certain degree threshold, e.g., 10 degrees, 5 degrees, 3 degrees or 1 degree. For instance, the term "substantially aligned" means that a deviation between two components may be less than or equal to a certain difference threshold, e.g., 2 μm or 1 μm. For instance, the term "substantially the same" means that a deviation is within, e.g., 10% of a given value or range, or mean within 5%, 3%, 2%, 1%, or 0.5% of a given value or range.

In the description and following claims, the term "horizontal direction" generally means a direction parallel to a horizontal plane, the term "horizontal plane" generally means a plane parallel to a direction X and a direction Yin the drawings (i.e., the direction X and the direction Y of the present invention may be considered as the horizontal directions), the term "vertical direction" and the term "top-view direction" generally mean a direction parallel to a direction Z and perpendicular to the horizontal direction in the drawings, and the direction X, the direction Y and the direction Z are perpendicular to each other. In the description and following claims, the term "top view" generally means a viewing result viewing along the vertical direction. In the description and following claims, the term "side view" generally means a viewing result viewing along the horizontal direction. In the description and following claims, the term "cross-sectional view" generally means a viewing result viewing a structure cutting along the vertical direction along the horizontal direction.

Although terms such as first, second, third, etc., may be used to describe diverse constituent elements, such constituent elements are not limited by the terms. The terms are used only to discriminate a constituent element from other constituent elements in the specification, and the terms do not relate to the sequence of the manufacture if the specification do not describe. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present invention.

In the present invention, an acoustic transducer is configured to perform an acoustic transformation, wherein the acoustic transducer may be a sound producing component, a speaker, a micro speaker or other suitable device, such that the acoustic transformation of the acoustic transducer may convert signals (e.g. electric signals) into an acoustic wave.

In the present invention, a frequency range of the acoustic wave produced by the acoustic transducer may be designed based on requirement(s). For instance, the acoustic transducer may produce the acoustic wave with the frequency range covering the whole human audible frequency range (e.g., from 20 Hz to 20 kHz), but not limited thereto. For instance, the acoustic transducer may produce the acoustic wave with the frequency higher than a specific frequency, such that this acoustic transducer may be a high frequency sound producing unit (tweeter), but not limited thereto. For instance, the acoustic transducer may produce the acoustic wave with the frequency lower than a specific frequency, such that this acoustic transducer may be a low frequency sound producing unit (woofer), but not limited thereto. Note that the specific frequency may be a value ranging from 800 Hz to 4 kHz (e.g., 1.44 kHz), but not limited thereto. The details of the high frequency sound producing unit may be referred to U.S. application Ser. No. 17/153,849 or Ser. No. 17/720,333 filed by Applicant, which is not narrated herein for brevity.

Referring to FIG. 1, FIG. 1 is a schematic diagram of a cross-sectional view illustrating a core part of a speaker system according to an embodiment of the present invention. As shown in FIG. 1, the speaker system 100 includes a first acoustic transducer 110 configured to generate a first acoustic wave W1, wherein a first frequency range of the first acoustic wave W1 may be designed based on requirement(s). For example, the first acoustic transducer 110 may be a high frequency sound producing unit (which may function as a tweeter), such that the first frequency range of the first acoustic wave W1 may be higher than a specific frequency, but not limited thereto.

In some embodiments, the first acoustic transducer 110 may be a MEMS (Micro Electro Mechanical Systems) fabricated device, such as a MEMS speaker including a MEMS structure (e.g., a unit has an anchor structure and a membrane anchored on the anchor structure, and the membrane is actuated to generate the first acoustic wave W1). For example, the first acoustic transducer 110 which is the MEMS speaker may be included in a MEMS chip, such that the first acoustic transducer 110 may be formed by semiconductor process, but not limited thereto. For example, the first acoustic transducer 110 may include silicon (e.g., single crystalline silicon or poly-crystalline silicon), silicon compound (e.g., silicon carbide, silicon oxide), germanium, germanium compound, gallium, gallium compound (e.g., gallium nitride or gallium arsenide) or a combination thereof, but not limited thereto.

As shown in FIG. 1, the speaker system 100 includes a spreading structure HS disposed on/over the first acoustic transducer 110, wherein the spreading structure HS may have a sound inlet OP1 and a sound outlet OP2, a sound passage SP exists between the sound inlet OP1 and the sound outlet OP2, the first acoustic transducer 110 is corresponding to the sound inlet OP1, and the first acoustic wave W1 generated by the first acoustic transducer 110 passes through the sound passage SP (i.e., the first acoustic wave W1 passes through the spreading structure HS). In some embodiments, as shown in FIG. 1, a size of the sound inlet OP1 may be less than a size of the sound outlet OP2.

A shape of the sound inlet OP1 and a shape of the sound outlet OP2 may be any suitable shape and be designed based on requirement(s). In some embodiments, the shape of the sound inlet OP1 and the shape of the sound outlet OP2 may be different.

As shown in FIG. 1, the sound passage SP of the spreading structure HS has a first (sound-passage) portion SP1, the first portion SP1 is between the sound inlet OP1 and the sound outlet OP2, and a first passage size of the first portion SP1 is less than the size of the sound inlet OP1 and the size of the sound outlet OP2. Note that, the term "passage size"

may be referred to a cross-sectional size/area of a corresponding/related portion of the sound passage SP. In the present invention, since the first passage size of the first portion SP1 is less than the size of the sound inlet OP1 and the size of the sound outlet OP2, after the first acoustic wave W1 passes through the sound passage SP of the spreading structure HS, the SPL of the first acoustic wave W1 is increased (i.e., the SPL of the first acoustic wave W1 at the sound outlet OP2 is greater than the SPL of the first acoustic wave W1 at the sound inlet OP1). Moreover, a directionality of the first acoustic wave W1 may be spread via the spreading structure HS, such that the first acoustic wave W1 becomes less directional when the first acoustic wave W1 propagates out of the sound outlet OP2. Also, since the size of the sound inlet OP1 is less than the size of the sound outlet OP2, the increasing effect of the SPL of the first acoustic wave W1 and the spreading effect of the first acoustic wave W1 would be enhanced.

Because of the design of the sound passage SP of the spreading structure HS, a length of the sound passage SP is increased. In order to decrease the size of the spreading structure HS, the spreading structure HS may be designed to make the sound passage SP have at least one curve part (e.g., the curve parts CP1 and/or CP2 shown in FIG. 1). Thus, the design of the sound passage SP of the spreading structure HS would be achieved in the condition of minimizing the size of the spreading structure HS. Take FIG. 1 as an example, the sound passage SP has two curve parts CP1 and CP2 to be N-shaped in the cross-sectional view, but not limited thereto.

In the following, an example of the speaker system 100 is described in detail, but the speaker system 100 of the present invention is not limited to the following.

Figure 2:
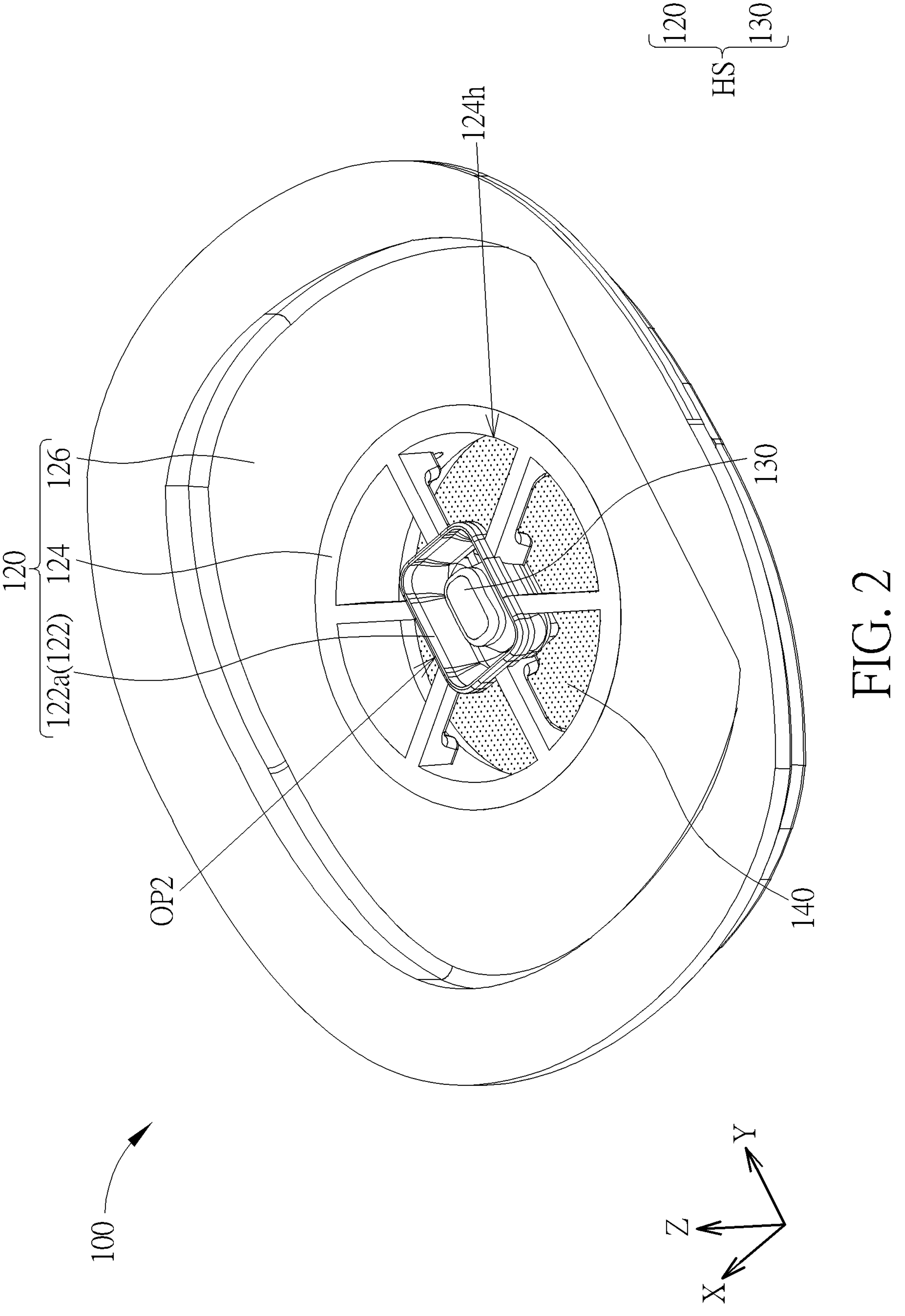
FIG. 2 is a schematic diagram illustrating a speaker system according to an embodiment of the present invention.
Figure 3:
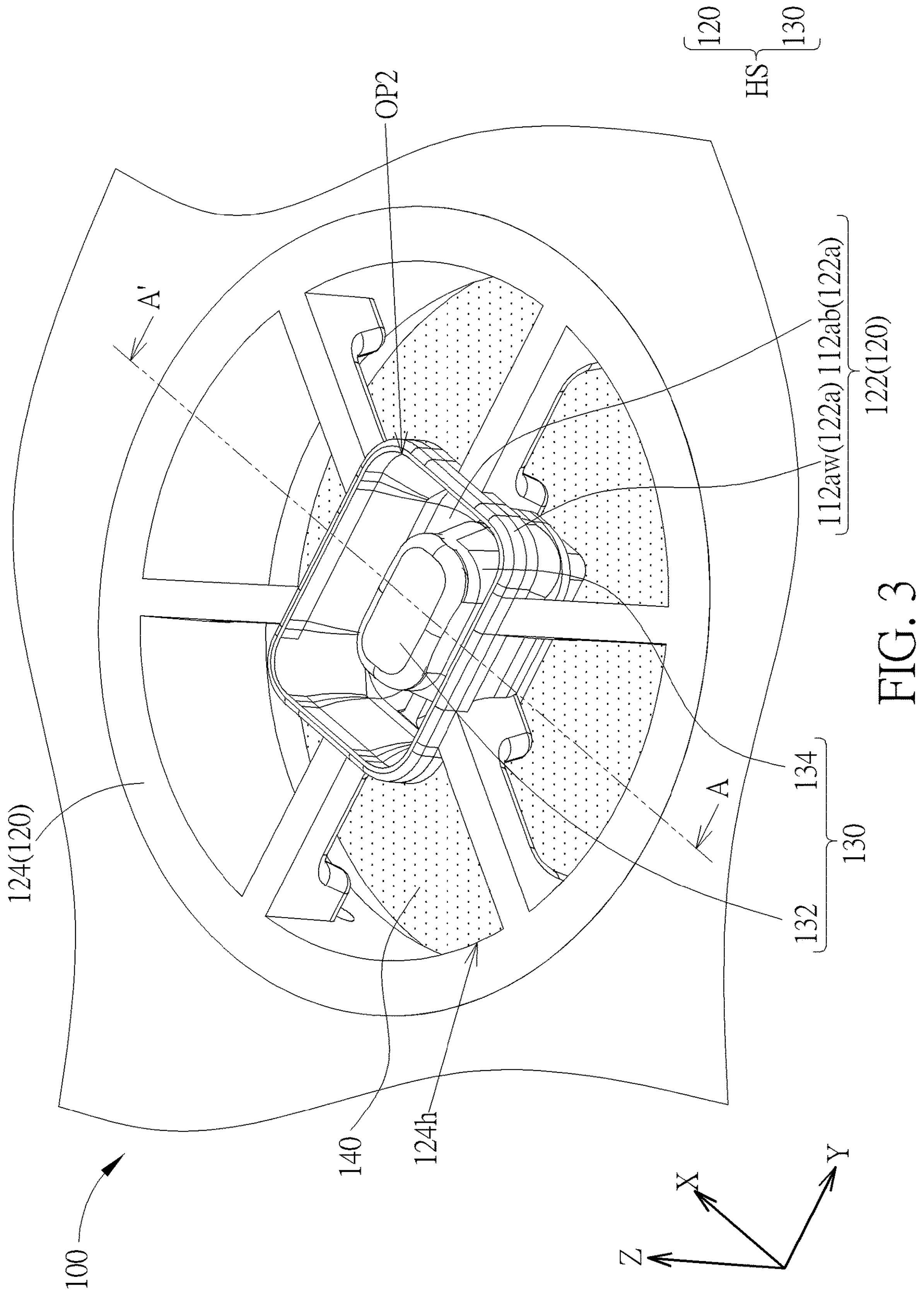
FIG. 3 is a schematic diagram illustrating a center part of a speaker system according to an embodiment of the present invention.
Figure 4:
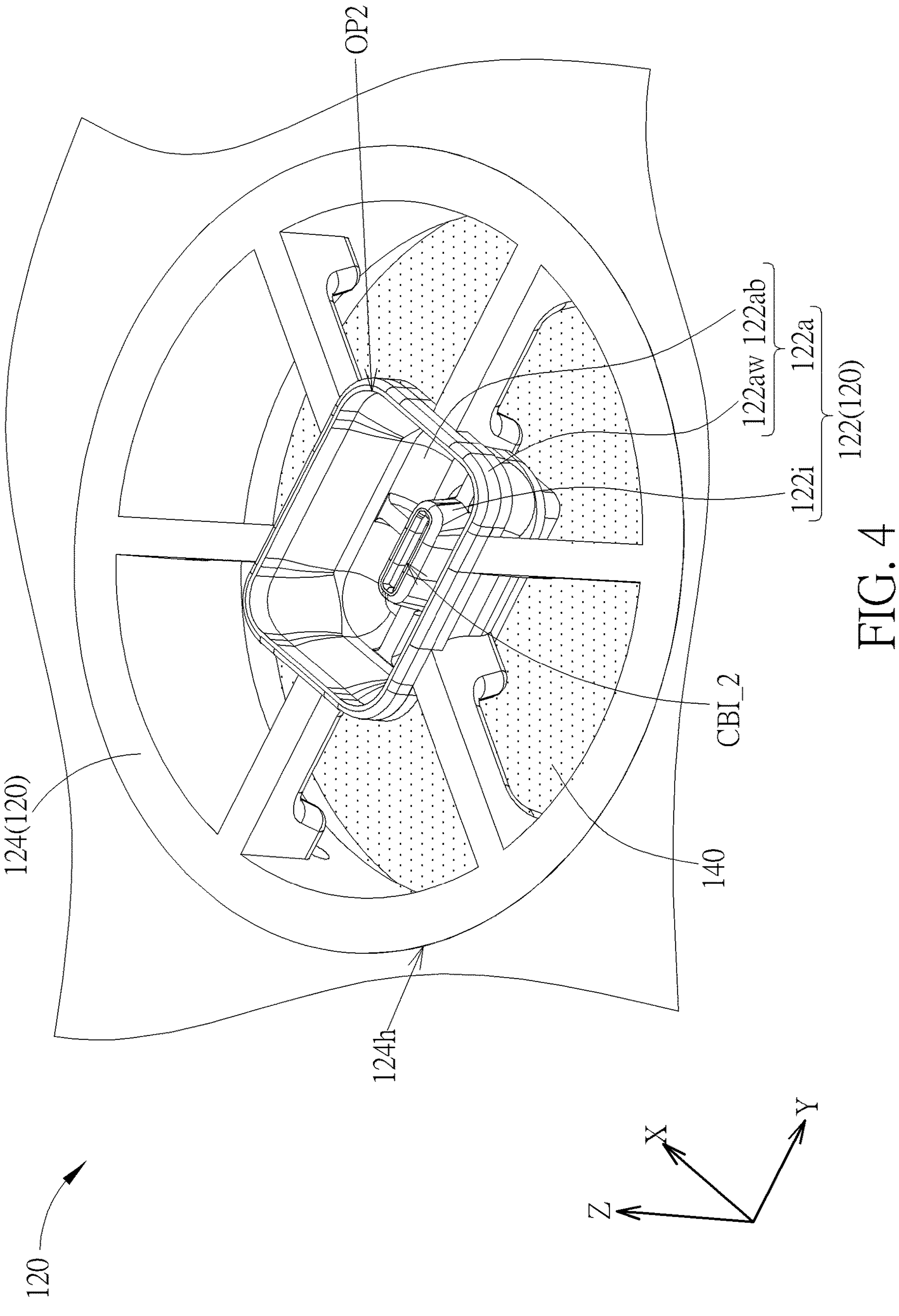
FIG. 4 is a schematic diagram illustrating a center part of a sound spreading plate of a speaker system according to an embodiment of the present invention.

Further referring to FIG. 2 to FIG. 4, FIG. 2 is a schematic diagram illustrating a speaker system according to an embodiment of the present invention, FIG. 3 is a schematic diagram illustrating a center part of a speaker system according to an embodiment of the present invention, and FIG. 4 is a schematic diagram illustrating a center part of a sound spreading plate of a speaker system according to an embodiment of the present invention. As shown in FIG. 1 to FIG. 4, the spreading structure HS of the speaker system 100 includes a sound spreading plate 120 and a cover 130 disposed on the sound spreading plate 120. In FIG. 1 to FIG. 4, the sound spreading plate 120 includes a body 122 having the aforementioned sound inlet OP1 and the aforementioned sound outlet OP2 of the spreading structure HS, and the cover 130 is disposed on/over the body 122 and covers the sound inlet OP1. Note that FIG. 1 is a cross-sectional view of the first acoustic transducer 110, the body 122 of the sound spreading plate 120 and the cover 130 shown in FIG. 3. In this embodiment, the core part of the speaker system 100 shown in FIG. 1 is formed of the first acoustic transducer 110, the body 122 of the sound spreading plate 120 and the cover 130 shown in FIG. 3.

In the present invention, the body 122 may be situated at any suitable position of the sound spreading plate 120. In some embodiments, as shown in FIG. 2 to FIG. 4, the body 122 may be situated at the center of the sound spreading plate 120, such that the first acoustic transducer 110 may be corresponding to the center of the sound spreading plate 120 in the direction Z, but not limited thereto.

As shown in FIG. 1 and FIG. 4, the body 122 has an inner channel structure **122*i* and an outer expanding structure 122*a* connected to and surrounding the inner channel structure 122*i*, wherein the inner channel structure 122*i* is covered by the cover 130**.

The outer expanding structure **122*a* has a bottom portion 122*ab* and a sidewall portion 122*aw* connected to each other, the bottom portion 122*ab* is connected to the sidewall portion 122*aw* and the inner channel structure 122*i*, and the sound outlet OP2 of the body 122 (i.e., the spreading structure HS) is surrounded by the top of the sidewall portion 122*aw* (i.e., the sidewall portion 122*aw* forms the sound outlet OP2). In some embodiments, in FIG. 1 and FIG. 4, the outer expanding structure 122*a* may be a bowl-shaped structure, and the shape of the sound outlet OP2 may be a rectangle with some chamfers, but not limited thereto. In FIG. 1 and FIG. 4, the outer expanding structure 122*a* may be narrower at the bottom portion 122*ab* and wider at the top of the sidewall portion 122*aw***, but not limited thereto.

In FIG. 1 and FIG. 4, the inner channel structure **122*i* may have a hollow structure (e.g., a tubular structure) and higher than the bottom portion 122*ab* of the outer expanding structure 122*a* in the direction Z, and an inner channel CBI exists inside the inner channel structure 122*i* (i.e., the inner channel CBI is covered by the cover 130), wherein the inner channel CBI has a first end CBI_1 and a second end CBI_2, the first end CBI_1 is the sound inlet OP1 of the body 122 (i.e., the spreading structure HS), and the second end CBI_2 higher than the bottom portion 122*ab* of the outer expanding structure 122*a* in the direction Z faces the cover 130**. For example, the shape of the sound inlet OP1 (i.e., the first end CBI_1 of the inner channel CBI) may be (substantially) a rectangle, and the shape of the second end CBI_2 of the inner channel CBI may be a rectangle with chamfers, but not limited thereto.

For example, in FIG. 1, the top of the inner channel structure **122*i* forming the second end CBI_2 of the inner channel CBI may be between the sound inlet OP1 (i.e., the first end CBI_1 of the inner channel CBI) and the sound outlet OP2 in the direction Z (i.e., the top of the inner channel structure 122*i* may not be higher than the sound outlet OP2 in the direction Z), but not limited thereto. For example, the inner channel structure 122*i* may be situated at a center of the body 122** (in the top view), but not limited thereto.

As shown in FIG. 1 to FIG. 3, the cover 130 may have a top structure 132 and a side structure 134 connected to and surrounding the top structure 132, wherein the top structure 132 may overlap the inner channel structure **122*i* of the body 122 in the direction Z, and the side structure 134 surrounds the inner channel structure 122*i* of the body 122. For example, in FIG. 1 to FIG. 3, the cover 130 may be disposed between the sound inlet OP1 and the sound outlet OP2 of the body 122, such that the cover 130 may not be higher than the sound outlet OP2 in the direction Z, and the cover 130 is surrounded by the outer expanding structure 122*a* of the body 122**, but not limited thereto.

As shown in FIG. 1, the cover 130 is disposed over the inner channel structure **122*i*, which means that, in the spreading structure HS, a space exists between the body 122 and the cover 130, such that a portion of the sound passage SP (e.g., the curve part CP1) is formed between the body 122 and the cover 130. In FIG. 1, the sound passage SP has the first portion SP1 formed between the inner channel structure 122*i* of the body 122 and an inner surface of the cover 130, wherein the first portion SP1 has the first passage size less than the size of the sound inlet OP1 and the size of the sound outlet OP2. In FIG. 1, the sound passage SP further has a second (sound-passage) portion SP2 and a third (sound-passage) portion SP3, and the first portion SP1 is connected between the second portion SP2 and the third portion SP3, wherein the second portion SP2 is between the outer expanding structure 122***a* of the body 122 and an outer surface of the cover 130, and the third portion SP3 is formed of the inner channel CBI of the inner channel structure 122*i* (i.e., the third portion SP3 is formed within the inner channel structure 122*i*).

In some embodiments, in FIG. 1, in the sound passage SP, the first passage size of the first portion SP1 is less than a second passage size of the second portion SP2 and a third passage size of the third portion SP3, such that the SPL of the first acoustic wave W1 is increased and the first acoustic wave W1 is spread to make the directionality of the first acoustic wave W1 decreased after the first acoustic wave W1 passes through the sound passage SP of the spreading structure HS. In some embodiments, the minimum passage size of the sound passage SP may exist in the first portion SP1.

In FIG. 1, in order to make the first portion SP1 of the sound passage SP have the smaller first passage size, the top structure 132 of the cover 130 may be as close to the inner channel structure 122*i* as possible, so as to enhance the increasing effect of the SPL of the first acoustic wave W1 and the spreading effect of the first acoustic wave W1. Also, because of the existence of the cover 130, the first portion SP1 of the sound passage SP would have suitable length, wherein the increasing effect of the SPL of the first acoustic wave W1 and the spreading effect of the first acoustic wave W1 is enhanced as the length of the first portion SP1 of the sound passage SP is increased.

Moreover, in FIG. 1, since the first passage size of the first portion SP1 is less than the third passage size of the third portion SP3 in the sound passage SP, the first passage size of the first portion SP1 is less than the size of the sound inlet OP1 (i.e., the first end CBI_1 of the inner channel CBI) and the size of the second end CBI_2 of the inner channel CBI. In some embodiments, the size of the sound inlet OP1 (i.e., the first end CBI_1 of the inner channel CBI) may be greater than the size of the second end CBI_2 of the inner channel CBI, such that the first acoustic wave W1 would be compressed when passing through the inner channel CBI, so as to enhance the increasing effect of the SPL of the first acoustic wave W1 and the spreading effect of the first acoustic wave W1. For example, in FIG. 1, in the inner channel CBI, the cross-section size of the inner channel CBI may be gradually decreased (narrower) from the first end CBI_1 to the second end CBI_2.

Furthermore, the top of the inner channel structure 122*i* forming the second end CBI_2 of the inner channel CBI may be designed to further affect the SPL of the first acoustic wave W1 in a specific frequency range overlapping at least a portion of the first frequency range of the first acoustic wave W1, so as to enhance the clarity of the first acoustic wave W1 in this specific frequency range. In some embodiments, since the first acoustic transducer 110 is the high frequency sound producing unit (tweeter) to make the first frequency range of the first acoustic wave W1 higher than a specific frequency, the above specific frequency range may be higher than this specific frequency (e.g., the top of the inner channel structure 122*i* may affect the SPL of the acoustic wave with mid and high frequencies). In some embodiments, the shape and the size of the top of the inner channel structure 122*i* (or the shape and the size of the second end CBI_2 of the inner channel CBI) are related to the above specific frequency range. For instance, the above specific frequency range may be higher as the length and/or the width of the second end CBI_2 of the inner channel CBI is increased.

On the other hand, as shown in FIG. 1, the curve parts CP1 and CP2 of the sound passage SP may be caused by the cover 130 and the body 122. For example, in FIG. 1, the curve part CP1 connected between the first portion SP1 and the third portion SP3 may be caused by the top structure 132 of the cover 130 and the inner channel structure 122*i* of the body 122, and the curve part CP2 connected between the first portion SP1 and the second portion SP2 may be caused by the side structure 134 of the cover 130 and the bottom portion 122*ab* of the outer expanding structure 122*a* of the body 122, but not limited thereto.

The curve part CP1 may be viewed as being formed by the cover 130, which means, the curve part CP1 is formed near/around the cover 130 and/or the curve part CP1 is formed because of the cover 130. Similarly, the curve part CP2 may be viewed as being formed by the bottom portion 122*ab*, which means, the curve part CP2 is formed near/around the bottom portion 122*ab* and/or the curve part CP2 is formed because of the bottom portion 122*ab*.

In addition, in the embodiment shown in FIG. 1, the first acoustic wave W1 propagates toward a first direction, e.g., toward a direction of −Z, through the first portion SP1, and the first acoustic wave W1 propagates toward a second direction opposite to the first direction, e.g., toward a direction of +Z, through the second portion SP2 and the third portion SP3.

By exploiting the curve part(s), the size of the spreading structure HS may be reduced for certain acoustic length corresponding to the sound passage SP.

In other words, the inner channel CBI can be viewed as being formed within the inner channel structure 122*i*, and the size of the inner channel CBI is gradually narrower from the sound inlet OP1 toward the second end CBI_2 of the inner channel CBI. The cover 130 is disposed over the inner channel structure 122*i*, such that the curve part CP1 of the sound passage SP is formed by the cover 130. On the other hand, an outer channel, also known as the second (sound-passage) portion SP2, can be viewed as being formed between the cover 130 and the outer expanding structure 122*a*. The sidewall portion 122*aw* has a shape such that a size of the outer channel is gradually wider from a bottom of the outer expanding structure 122*a* toward the sound outlet OP2. The curve part CP2 of the sound passage SP is formed by a bottom portion 122*ab* of the outer expanding structure 122*a*.

Figure 5:
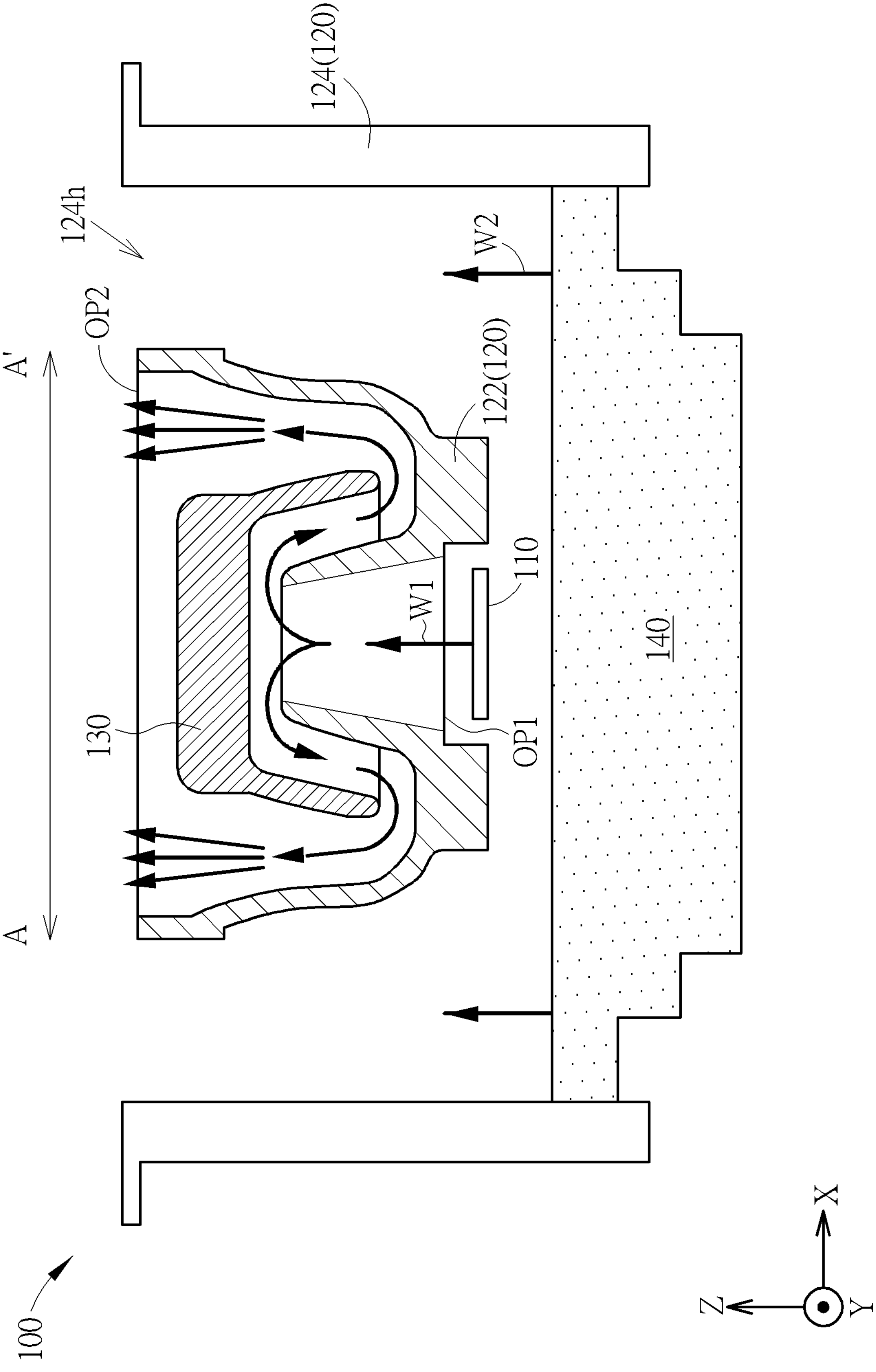
FIG. 5 is a schematic diagram of a cross-sectional view illustrating a center part of a speaker system according to an embodiment of the present invention.

Further referring to FIG. 5, FIG. 5 is a schematic diagram of a cross-sectional view illustrating a center part of a speaker system according to an embodiment of the present invention, wherein the cross-sectional view of the structure shown in FIG. 5 may be taken along a cross-sectional line A-A' in FIG. 3. Compared with FIG. 1, FIG. 5 further shows the surrounding of the core part of the speaker system 100 shown in FIG. 1 and another acoustic transducer. As shown in FIG. 2 to FIG. 5, the speaker system 100 may further include a second acoustic transducer 140 configured to generate a second acoustic wave W2, wherein a second frequency range of the second acoustic wave W2 may be designed based on requirement(s). For example, the second acoustic transducer 140 may be a low frequency sound producing unit (which may function as a woofer), such that the second frequency range of the second acoustic wave W2 may be lower than a specific frequency, but not limited thereto. Note that an average value of the first frequency range is higher than an average value of the second frequency range.

In other words, as shown in FIG. 5, the spreading structure HS is disposed over the first acoustic transducer 110 and configured to guide the first acoustic wave W1 to propagate through the sound passage SP formed within the spreading structure HS. The directionality of the first acoustic wave W1 is spread at the sound outlet OP2 of the spreading structure HS after the first acoustic wave W1 propagates through the sound passage SP in the spreading structure HS.

The second acoustic transducer 140 may be any suitable speaker. For example, the second acoustic transducer 140 may be a speaker with dynamic driver (e.g., an acoustic dynamic driver), a MEMS speaker including a MEMS structure or other suitable speaker.

The second acoustic transducer 140 may be situated at any suitable position. In some embodiments, as shown in FIG. 5, the second acoustic transducer 140 may be corresponding to the center of the sound spreading plate 120 in the direction Z, but not limited thereto. In some embodiments, as shown in FIG. 5, the second acoustic transducer 140 may overlap the first acoustic transducer 110 in the direction Z, but not limited thereto. For example, in FIG. 5, the center of the first acoustic transducer 110 is corresponding to the center of the second acoustic transducer 140 in the direction Z, but not limited thereto.

The second acoustic wave W2 also passes through the sound spreading plate 120. In FIG. 2 to FIG. 5, the sound spreading plate 120 may further include a sound passing structure 124 corresponding to the second acoustic transducer 140, wherein the sound passing structure 124 may have at least one hollow part **124*h*, wherein the second acoustic wave W2 passes through the hollow part 124*h*, so as to pass through the sound spreading plate 120**.

The sound passing structure 124 may be designed based on requirement(s). For example, in FIG. 2 to FIG. 5, the sound passing structure 124 may be directly connected to the body 122, but not limited thereto. For example, in FIG. 2 to FIG. 5, the body 122 may be surrounded by the sound passing structure 124 and/or the hollow part(s) **124*h*, but not limited thereto. In FIG. 2 to FIG. 5, the sound passing structure 124 and the body 122 may be concentric (i.e., the center of the sound passing structure 124 may be corresponding to the center of the body 122 in the direction Z), and/or the hollow part(s) 124*h* and the body 122 may be concentric (i.e., the center of the hollow part(s) 124*h* may be corresponding to the center of the body 122** in the direction Z), but not limited thereto.

As shown in FIG. 2 to FIG. 5, the sound passing structure 124 may have a plurality of hollow parts **124*h* (e.g., six hollow parts 124*h* in figures), and each hollow part 124*h* has the same shape and the same size, but not limited thereto. In FIG. 2 to FIG. 5, the hollow part 124*h* may overlap the second acoustic transducer 140** in the direction Z, but not limited thereto.

According to above, the first acoustic wave W1 generated by the first acoustic transducer 110 and the second acoustic wave W2 generated by the second acoustic transducer 140 would pass through the spreading structure HS (i.e., the first acoustic wave W1 passes through the sound passage SP formed of the body 122 and the cover 130, and the second acoustic wave W2 passes through the hollow part **124*h* of the sound passing structure 124), such that two acoustic transducers may produce the sound in the one speaker system 100**.

In the present invention, the aforementioned speaker system 100 would be disposed within any suitable sound producing device, such that the sound producing device would use the MEMS speaker (i.e., the first acoustic transducer 110) to generate a loud and spreading sound.

Figure 6:
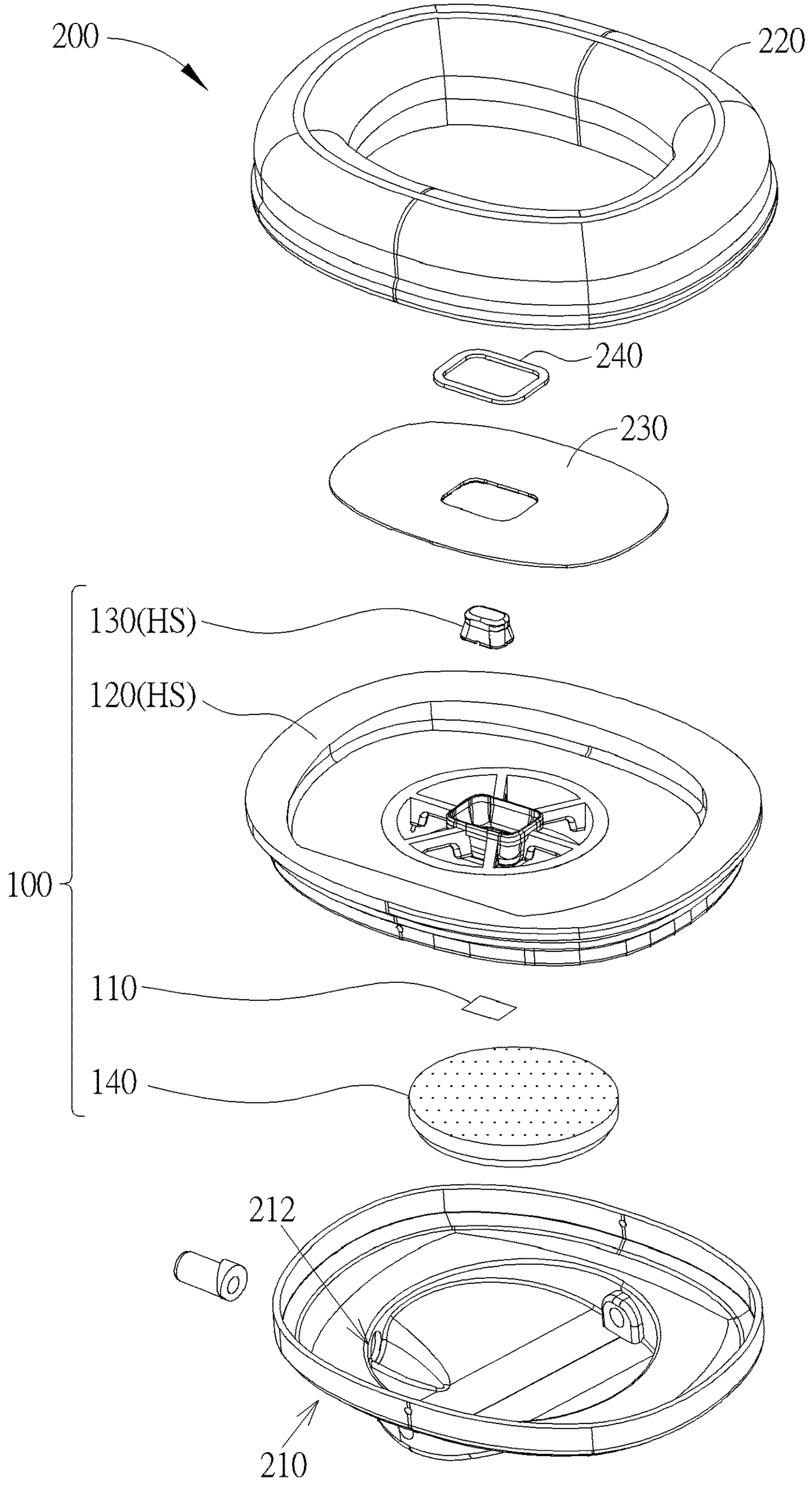
FIG. 6 is a schematic diagram of an exploded view illustrating a headphone according to an embodiment of the present invention.

Referring to FIG. 6, FIG. 6 is a schematic diagram of an exploded view illustrating a headphone according to an embodiment of the present invention. As shown in FIG. 6, the aforementioned speaker system 100 may be disposed within a headphone 200 which is a kind of sound producing device.

The headphone 200 may further include any suitable component based on requirement(s). In FIG. 6, the headphone 200 may further include a headphone cover 210 and a cushion 220 which are the outmost components, wherein the speaker system 100 is disposed between the headphone cover 210 and the cushion 220. The headphone cover 210 and the cushion 220 are configured to protect the components disposed them, and the cushion 220 enhances a wearing comfort of the headphone 200. Furthermore, in FIG. 6, the headphone cover 210 has a hole 212, such that an electric wire may be connected between the acoustic transducer of the speaker system 100 and an outer device through the hole 212. In FIG. 2 and FIG. 6, the sound spreading plate 120 of the speaker system 100 may have a peripheral region 126 surrounding the sound passing structure 124 and the body 122, and the cushion 220 may be disposed on the peripheral region 126.

In addition, in FIG. 6, the headphone 200 may further include a foam structure 230 disposed between the sound spreading plate 120 of the speaker system 100 and the cushion 220, wherein the foam structure 230 may cover the sound passing structure 124, so as to prevent an outer object (e.g., the dust) from entering the speaker system 100 through the hollow part **124*h*, thereby protecting the second acoustic transducer 140. In FIG. 6, the headphone 200 may further include a ring 240 disposed on the foam structure 230, so as to fix the foam structure 230**.

In summary, according to the speaker system and a spreading structure of the present invention, after the acoustic wave passes through the sound passage of the spreading structure, the SPL of the acoustic wave is increased, and the acoustic wave is spread to make the directionality of the acoustic wave decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A speaker system, comprising:

a first acoustic transducer, configured to generate a first acoustic wave;

a second acoustic transducer, configured to generate a second acoustic wave; and a spreading structure, comprising a body and a cover disposed on the body, wherein the body comprises an outer expanding structure, and an outer channel is formed between the cover and the outer expanding structure;

wherein the spreading structure is disposed over the first acoustic transducer and configured to guide the first acoustic wave to propagate through a sound passage formed within the spreading structure;

wherein a directionality of the first acoustic wave is spread at a sound outlet of the spreading structure after the first acoustic wave propagates through the sound passage in the spreading structure.

2. The speaker system of claim 1, wherein the body comprises an inner channel structure;

wherein an inner channel is formed within the inner channel structure.

3. The speaker system of claim 2, wherein a size of the inner channel is gradually narrower from a sound inlet toward an end of the inner channel;

wherein the end of the inner channel faces the cover.

4. The speaker system of claim 2, wherein the cover is disposed over the inner channel structure, such that a curve part of the sound passage is formed by the cover.

5. The speaker system of claim 1, wherein the outer expanding structure comprises a sidewall portion;

wherein the sidewall portion has a shape such that a size of the outer channel is gradually wider from a bottom of the outer expanding structure toward the sound outlet.

6. The speaker system of claim 1, wherein the outer expanding structure comprises a bottom portion;

wherein a curve part of the sound passage is formed by the bottom portion of the outer expanding structure.

7. The speaker system of claim 1, wherein a sound pressure level of the first acoustic wave at the sound outlet is greater than a sound pressure level of the first acoustic wave at a sound inlet of the spreading structure.

8. The speaker system of claim 1, wherein the first acoustic transducer functions as a tweeter of the speaker system, and the second acoustic transducer functions as a woofer of the speaker system.

9. The speaker system of claim 1, wherein the first acoustic transducer is a MEMS (Micro Electro Mechanical Systems) fabricated device.

10. The speaker system of claim 1, further comprising a sound spreading plate comprising the body, wherein the sound spreading plate further comprises at least one hollow part, and the second acoustic wave passes through the at least one hollow part.

11. The speaker system of claim 10, wherein the at least one hollow part surrounds the body.

12. The speaker system of claim 10, wherein the body and the at least one hollow part are concentric.

13. The speaker system of claim 1, wherein a center of the first acoustic transducer is corresponding to a center of the second acoustic transducer.

14. The speaker system of claim 1, wherein the second acoustic transducer is an acoustic dynamic driver.

15. The speaker system of claim 1, wherein the body further comprises an inner channel structure;

wherein the sound passage comprises a first portion, a second portion and a third portion;

wherein the first portion is formed between an inner surface of the cover and the inner channel structure, the second portion is formed between an outer surface of the cover and the outer expanding structure, and the third portion is formed within the inner channel structure.

16. The speaker system of claim 15, wherein the first acoustic wave propagates toward a first direction through the first portion, and the first acoustic wave propagates toward a second direction through the second portion and the third portion;

wherein the second direction is opposite to the first direction.

17. The speaker system of claim 15, wherein the sound passage comprises:

a first curve part connecting the first portion and the second portion; and a second curve part connecting the first portion and the third portion.

18. The speaker system of claim 1, wherein the sound passage is N-shaped in a cross-sectional view.

19. The speaker system of claim 1, wherein the speaker system is applied in a headphone.

20. A spreading structure, disposed or to be disposed within a speaker system, the spreading structure comprising:

a body comprising an outer expanding structure; and a cover disposed on the body;

wherein the spreading structure is disposed or to be disposed over a first acoustic transducer of the speaker system;

wherein the spreading structure is configured to guide a first acoustic wave generated by the first acoustic transducer to propagate through a sound passage formed within the spreading structure;

wherein an outer channel is formed between the cover and the outer expanding structure;

wherein the outer expanding structure comprises a sidewall portion;

wherein the sidewall portion has a shape such that a size of the outer channel is gradually wider from a bottom of the outer expanding structure toward a sound outlet of the spreading structure.

21. The spreading structure of claim 20, wherein a directionality of the first acoustic wave is spread at the sound outlet of the spreading structure after the first acoustic wave propagates through the sound passage in the spreading structure.

22. The spreading structure of claim 20, wherein the body comprises an inner channel structure;

wherein an inner channel is formed within the inner channel structure;

wherein a size of the inner channel is gradually narrower from a sound inlet toward an end of the inner channel;

wherein the end of the inner channel faces the cover.

23. The spreading structure of claim 20, further comprising:

a sound spreading plate;

wherein the body is disposed within the sound spreading plate;

wherein at least one hollow part is formed within the sound spreading plate;

wherein the sound spreading plate is disposed over a second acoustic transducer;

wherein a second acoustic wave generated by the second acoustic transducer propagates through the at least one hollow part.

24. A headphone, comprising:

a first acoustic transducer configured to generate a first acoustic wave, wherein the first acoustic transducer is a MEMS (Micro Electro Mechanical Systems) fabricated speaker; and a spreading structure comprising a body and a cover disposed on the body, wherein the body comprises an inner channel structure and an outer expanding structure;

wherein the spreading structure is disposed over the first acoustic transducer and configured to guide the first acoustic wave to propagate through a sound passage formed within the spreading structure;

wherein a directionality of the first acoustic wave is spread at a sound outlet of the spreading structure after the first acoustic wave propagates through the sound passage in the spreading structure;

wherein a size of an inner channel formed within the inner channel structure is gradually narrower from a sound inlet toward an end of the inner channel facing the cover;

wherein the outer expanding structure comprises a sidewall portion;

wherein the sidewall portion has a shape such that a size of an outer channel formed between the cover and the outer expanding structure is gradually wider from a bottom of the outer expanding structure toward the sound outlet.

25. The headphone of claim 24, wherein the spreading structure further comprises a sound spreading plate, and the body is disposed within the sound spreading plate;

wherein at least one hollow part is formed within the sound spreading plate;

wherein the headphone comprises a second acoustic transducer configured to generate a second acoustic wave;

wherein the sound spreading plate is disposed over the second acoustic transducer, and the second acoustic wave propagates through the at least one hollow part.

26. The headphone of claim 25, wherein the second acoustic transducer is an acoustic dynamic driver.

27. A speaker system, comprising:

a first acoustic transducer, configured to generate a first acoustic wave;

a second acoustic transducer, configured to generate a second acoustic wave;

a spreading structure, comprising a body and a cover disposed on the body; and a sound spreading plate, comprising the body;

wherein the spreading structure is disposed over the first acoustic transducer and configured to guide the first acoustic wave to propagate through a sound passage formed within the spreading structure;

wherein a directionality of the first acoustic wave is spread at a sound outlet of the spreading structure after the first acoustic wave propagates through the sound passage in the spreading structure;

wherein the sound spreading plate further comprises at least one hollow part, and the second acoustic wave passes through the at least one hollow part.

28. A speaker system, comprising:

a first acoustic transducer, configured to generate a first acoustic wave;

a second acoustic transducer, configured to generate a second acoustic wave; and a spreading structure;

wherein the spreading structure is disposed over the first acoustic transducer and configured to guide the first acoustic wave to propagate through a sound passage formed within the spreading structure;

wherein a directionality of the first acoustic wave is spread at a sound outlet of the spreading structure after the first acoustic wave propagates through the sound passage in the spreading structure;

wherein the sound passage is N-shaped in a cross-sectional view.

29. A spreading structure, disposed or to be disposed within a speaker system, the spreading structure comprising:

a body;

a cover disposed on the body; and a sound spreading plate, wherein the body is disposed within the sound spreading plate;

wherein the spreading structure is disposed or to be disposed over a first acoustic transducer of the speaker system;

wherein the spreading structure is configured to guide a first acoustic wave generated by the first acoustic transducer to propagate through a sound passage formed within the spreading structure;

wherein at least one hollow part is formed within the sound spreading plate;

wherein the sound spreading plate is disposed over a second acoustic transducer;

wherein a second acoustic wave generated by the second acoustic transducer propagates through the at least one hollow part.

30. A headphone, comprising:

a first acoustic transducer configured to generate a first acoustic wave, wherein the first acoustic transducer is a MEMS (Micro Electro Mechanical Systems) fabricated speaker; and a spreading structure comprising a body and a cover disposed on the body;

wherein the spreading structure is disposed over the first acoustic transducer and configured to guide the first acoustic wave to propagate through a sound passage formed within the spreading structure;

wherein a directionality of the first acoustic wave is spread at a sound outlet of the spreading structure after the first acoustic wave propagates through the sound passage in the spreading structure;

wherein the spreading structure further comprises a sound spreading plate, and the body is disposed within the sound spreading plate;

wherein at least one hollow part is formed within the sound spreading plate;

wherein the headphone comprises a second acoustic transducer configured to generate a second acoustic wave;

wherein the sound spreading plate is disposed over the second acoustic transducer, and the second acoustic wave propagates through the at least one hollow part.

* * * * *